United States Patent [19]

Stigberg

[11] Patent Number: 5,171,389
[45] Date of Patent: Dec. 15, 1992

[54] SPIRAL CONSTRUCTION OF GROOVED LONG NIP PRESS

[75] Inventor: Carl E. Stigberg, Schenectady, N.Y.

[73] Assignee: Albany International Corp., Albany, N.Y.

[21] Appl. No.: 790,575

[22] Filed: Nov. 8, 1991

[51] Int. Cl.⁵ .................. B29C 53/78; B29C 63/10
[52] U.S. Cl. ................... 156/165; 156/187; 156/195; 156/244.15; 156/267; 156/494; 162/358.4
[58] Field of Search ............... 156/137, 153, 190, 195, 156/244.15, 267, 494, 165, 187; 162/358.2, 358.4, 901; 198/846, 847, 699.1; 474/251; 138/129, 150, 154; 427/171, 176

[56] References Cited

U.S. PATENT DOCUMENTS

| | | | |
|---|---|---|---|
| 3,273,600 | 9/1966 | Swan | 138/154 |
| 3,280,851 | 10/1966 | Habdas | 138/154 |
| 3,291,288 | 12/1966 | Haustovich | 198/699.1 |
| 3,373,067 | 3/1968 | Hagstrom | 156/153 |
| 4,494,947 | 1/1985 | Miranti et al. | 474/251 |
| 4,552,620 | 11/1985 | Adams | 162/358.4 |
| 4,643,916 | 2/1987 | Kiuchi | 156/137 |
| 4,978,428 | 12/1990 | Cronin et al. | 162/358.4 |
| 4,981,721 | 1/1991 | Krenkel et al. | 427/171 |

FOREIGN PATENT DOCUMENTS 2059343  4/1981  United Kingdom ............... 427/176

Primary Examiner—Michael W. Ball
Assistant Examiner—Steven D. Maki
Attorney, Agent, or Firm—Kane, Dalsimer, Sullivan, Kurucz, Levy, Eisele & Richard

[57] ABSTRACT

A grooved, void-volume belt for use on a long nip press for dewatering a fibrous web may be manufactured by winding a grooved strip or ribbon of polymeric material onto a standard LNP belt in the form of a closed helix, and by attaching the grooved strip to the belt by suitable means. The strip may be extruded from a polymeric material, such as polyurethane, and is provided with at least one longitudinal groove. The method enables one to manufacture a grooved, void-volume belt without the prior necessity of coating both sides of a base fabric with a polymeric material, and of cutting grooves in the coating on the outer side of the belt.

5 Claims, 4 Drawing Sheets

SPIRAL CONSTRUCTION OF GROOVED LONG NIP PRESS

BACKGROUND OF THE INVENTION

1. Field of the Invention

The present invention relates to mechanisms for extracting water from a web of material, and more particularly, from a fibrous web being processed into a paper product on a papermaking machine. Specifically, the present invention is an impermeable belt designed for use on a long nip press on a papermaking machine, and having grooves on its outer surface for the temporary storage of water pressed from the fibrous web, and a method for constructing the impermeable belt.

2. Description of the Prior Art

During the papermaking process, a fibrous web is formed on a forming wire by depositing a fibrous slurry thereon. A large amount of water is drained from the slurry during this process, after which the newly formed web proceeds to a press section. The press section includes a series of press nips, in which the fibrous web is subjected to compressive forces designed to remove water therefrom. The web finally proceeds to a drying section which includes heated dryer drums around which the web is directed. The heated dryer drums reduce the water content of the web to a desirable level through evaporation.

Rising energy costs have made it increasingly desirable to remove as much water as possible from the web prior to its entering the dryer section. The dryer drums are often heated from within by steam and related costs can be substantial, especially when a large amount of water needs to be removed from the web.

Traditionally, press sections have included a series of nips formed by pairs of adjacent cylindrical press rollers. In recent years, the use of long press nips has been found to be advantageous over the use of nips formed by pairs of adjacent rollers. Long press nips are so called because they have a greater extent in the longitudinal, or machine, direction than those formed by pairs of adjacent rollers. The longer the web can be subjected to pressure in the nip, the more water can be removed there, and, consequently, the less will remain to be removed through evaporation in the dryer section. This is accomplished in a long press nip by virtue of the fact that any given portion of the fibrous web takes a longer time to pass through the nip.

The present invention relates to long nip presses of the shoe type. In this variety of long nip press, the nip is formed between a cylindrical press roller and an arcuate pressure shoe. The latter has a cylindrically concave surface having a radius of curvature close to that of the cylindrical press roller. When roller and shoe are brought into close physical proximity, a nip is formed which can be five to ten times longer in the machine direction than one formed between two press rollers. This increases the so-called dwell time of the fibrous web in the long nip while maintaining the same level of pressure per square inch pressing force used in a two-roller press. The result of this new long nip technology has been a dramatic increase in dewatering of the fibrous web in the long nip when compared to conventional nips on paper machines.

A long nip press of the shoe type requires a special belt, such as that shown in U.S. Pat. No. 4,946,731 to Dutt. This belt is designed to protect the press fabric supporting, carrying, and dewatering the fibrous web from the accelerated wear that would result from direct, sliding contact over the stationary pressure shoe. Such a belt must be made with a smooth impervious surface that rides, or slides over the stationary shoe on a lubricating film of oil. The belt moves through the nip at roughly the same speed as the press fabric, thereby subjecting the pres fabric to minimal amounts of rubbing against stationary components of the press.

A typical configuration for a long nip pres involves the use of two press fabrics. The components in the nip can be listed in the following sequence: a grooved cylindrical press roller, a first press fabric, the fibrous web or nascent paper sheet, a second press fabric, the special belt, the lubricating film, and the arcuate pressure shoe.

Many of the long nip presses currently in commercial operation are of the above configuration. However, this so-called double-felted long nip press is limited to certain types of paper grades. To expand the application of the long nip press to finer paper grades and newsprint, which, during manufacture, come into contact with a smooth press roll, it will be necessary to develop a single-felted long nip press.

In a single-felted long nip press, the components in the nip would be listed in the following sequence: a smooth cylindrical press roller, the fibrous web or nascent paper sheet, the press fabric, the special belt, the lubricating film, and the arcuate pressure shoe. As implied by this sequence, the fibrous web actually contacts the cylindrical press roller in a single-felted long nip press.

In the double-felted long nip press, the water pressed from the fibrous web can pass into either of the two press fabrics, as well as into the grooves provided in the cylindrical press roller. In the single-felted long nip press, two of these sinks for water storage have been eliminated. There is only one felt and, because the fibrous web contacts the cylindrical press roller directly, this roller must have a smooth surface. Clearly, this loss of temporary water storage space must be made up in another fashion, because it is absolutely mandatory that voids be provided in the nip of the press, so that water pressed from the paper sheet in a single-felted long nip press will have a place to go.

Two approaches have been taken to achieve a satisfactory solution of this problem. Canadian Patent No. 1,190,779 shows a long nip press belt having voids on the felt side. These voids arise from the weave pattern of the base fabric and the absence of impregnation on the felt side of the belt, and provide a place into which liquid can be transferred during passage of the fibrous web, press fabric, and special belt through the nip.

The other approach is represented by the previously noted U.S. Pat. No. 4,946,731. This shows a long nip press belt having grooves on the side facing the felt, or press fabric, to store water pressed from the fibrous web.

To make a belt of the variety shown in U.S. Pat. No. 4,946,731, a base fabric having the form of an endless loop is coated, both inside and outside, with a polymeric resin, such as polyurethane. This coating is applied in such a manner as to completely impregnate the structure of the base fabric rendering it impervious to liquids. It should further be smooth and of uniform thickness.

On the outer surface of the coated belt are cut a plurality of grooves, which may, for example, lie in the machine direction or cross-machine direction. The grooves define channels for water pressed from the fibrous web in the long press nip, and are separated from one another by what may be referred to as land areas. These areas are portions of the coating not cut away to create grooves.

Alternatively, the grooves may be provided by means of an embossing roll run over the outer surface of the coated belt before the polymeric resin has had sufficient time to cure to a hardened state.

Clearly, the manufacture of a grooved, long nip press belt of this variety requires a complicated series of steps. The present invention has been motivated by a desire to streamline the production of a grooved belt by rendering unnecessary the steps of coating both sides of the base fabric, and of cutting, by one of several possible means, grooves into the outer coated surface thereof.

SUMMARY OF THE INVENTION

The present invention is a grooved long-nip-press (LNP) belt and a method for making same. The method requires neither the coating of both sides of a base fabric, nor the provision of grooves into the outer surface thereof by mechanical means after coating.

To practice the method, one first must provide what may be referred to as a standard LNP belt. A so-called standard LNP belt is one which may be typically used on a double-felted long nip press. Such an LNP belt comprises a base fabric impregnated with a polymeric resin material, such as polyurethane. One side of the belt, that is, the side from which it is impregnated, is smooth, and forms the inner surface of the flexible belt, which itself is in the form of a closed loop. The base fabric must be of sufficiently open weave to permit total impregnation by the polymer material to eliminate any voids. The flexible belt has a uniform thickness, as measured between the smooth inner surface and a plane defined by the tops of the knuckles formed where the yarns in one direction in the base fabric weave over those in the other direction. These knuckles, in an LNP belt of this variety, are ordinarily visible on the outer, uncoated side of the belt. Depending on the method used to coat and impregnate the base fabric, the coated surface, after the polymer material has been cured, may require sanding or grinding to provide the flexible belt with the necessary uniform thickness or caliper. When the flexible belt is in use on a dewatering press of the long nip type, its smooth inner surface faces and slides against the lubricated, arcuate shoe component of the long nip press, while the outer surface, on which the knuckles of the base fabric may be visible, faces the papermaker's felt means. The belt's impregnation is impermeable, so that the lubricant used to enable the smooth inner surface of the flexible belt to slide freely over the surface of the arcuate pressure shoe will not contaminate the papermaker's felt means and fibrous web, the latter being the nascent paper sheet.

According to the present invention, such a standard LNP belt is mounted on a pair of process rolls. These process rolls are rotatable about their respective axes, and are situated such that their axes are parallel to one another. The distance separating the process rolls from one another may be adjusted and fixed to a set position so as to place the LNP belt deployed therebetween under a desired level of tension. Of course, when so deployed on the process rolls, the inner, coated surface of the LNP belt contacts the process rolls, while the outer, uncoated surface, on which the knuckles of the base fabric may be visible, are outside.

Onto the outer, uncoated side of the LNP belt a strip or ribbon of an appropriate material, such as a polymeric resin material, for example, polyurethane, is wound in a closed helix. The strip or ribbon is made by extrusion or some other mechanical means, and is configured to have at least one groove of desired depth and width. As a consequence, the outer surface of an LNP belt made in accordance with the present invention is spirally grooved without the necessity of coating both sides of the base fabric with polymeric resin material, and of cutting grooves into the outer coated surface.

The strip or ribbon may be affixed to the uncoated side of the standard LNP belt by means of an adhesive, which may either be pre-applied to the under surface of the strip or applied to the strip/belt interface during the helical winding. A urethane-based adhesive may be used for this purpose. One might also use a thin coating of fast-curing urethane which would fill any spaces between the knuckles on the uncoated side of the standard LNP belt, and would provide an adhesive surface which would cure with time, heat or a combination of both. Alternatively, the strip may be affixed to the surface of the belt through the application of heat generated, for example, by an appropriate infrared heating device.

The present invention will now be described in more complete detail with frequent reference being made to the following set of figures.

DETAILED DESCRIPTION OF THE PREFERRED EMBODIMENT

Figure 1:
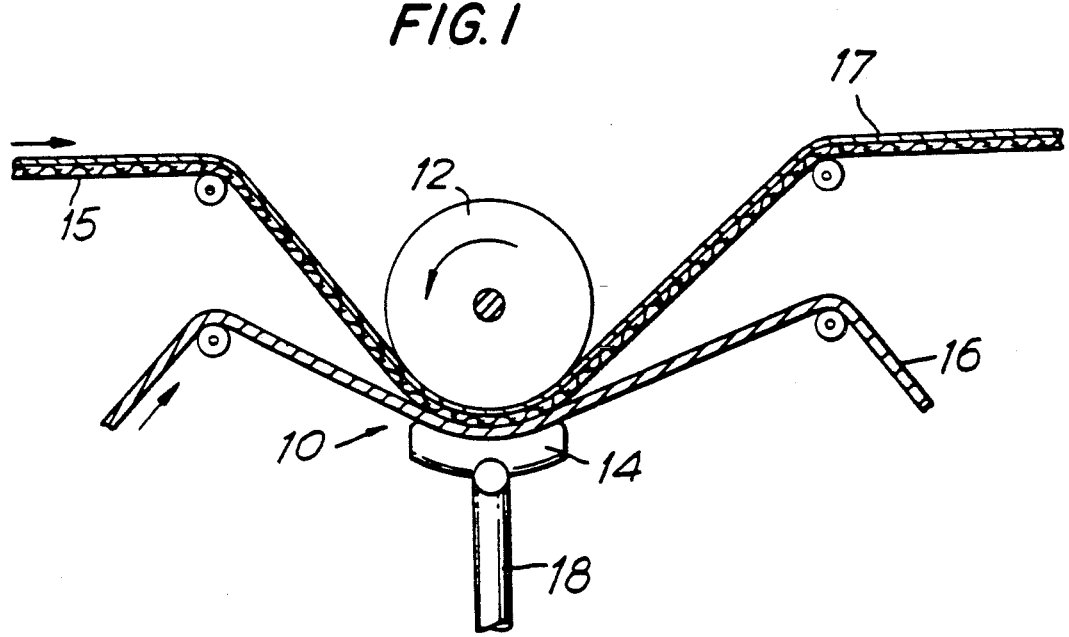
FIG. 1 is a side elevational view of a extended press nip for which the belt of the present invention has been designed.
Figure 2:
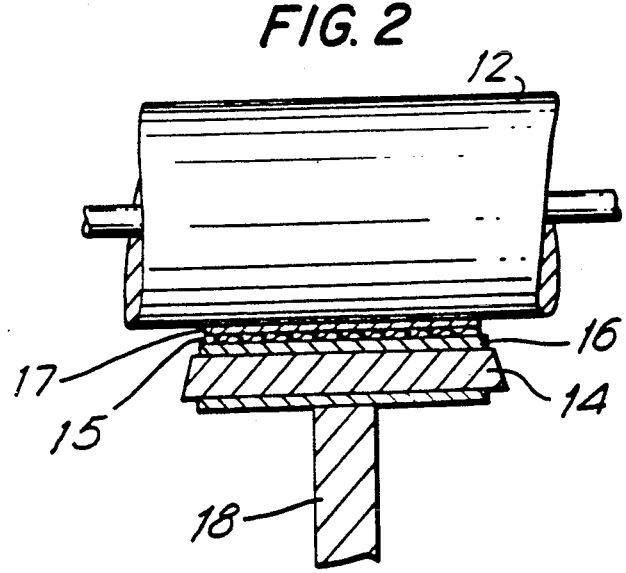
FIG. 2 is a partially sectioned front view of the press nip shown in FIG. 1.

A single-felted long nip press for dewatering a fibrous web being processed into a paper product on a paper machine is shown in FIGS. 1 and 2. The press nip 10 is defined by a smooth cylindrical press roller 12, an arcuate pressure shoe 14, and a belt 16 of the present invention arranged such that it bears against the surface of the cylindrical press roller 12. The arcuate pressure shoe 14 has about the same radius of curvature as the cylindrical press roller 12. The distance between the cylindrical press roller 12 and the arcuate pressure shoe 14 may be adjusted by means of conventional hydraulic or mechanical apparatus, which is not shown, connected to rod 18 pivotally secured to arcuate pressure shoe 14. The rod 18 may also be actuated to apply the desired pressure to the arcuate pressure shoe 14. It will be appreciated that the cylindrical press roller 12 and arcuate pressure shoe 14 described above and shown in FIGS. 1 and 2 are conventional in the art.

Also shown in FIGS. 1 and 2 are a papermaker's wet press fabric 15, and a fibrous web 17 being processed into a paper sheet. The motions of the belt 16, press fabric 15, fibrous web 17 and cylindrical press roller 12 are as indicated by the arrows in FIG. 1.

Figure 3:
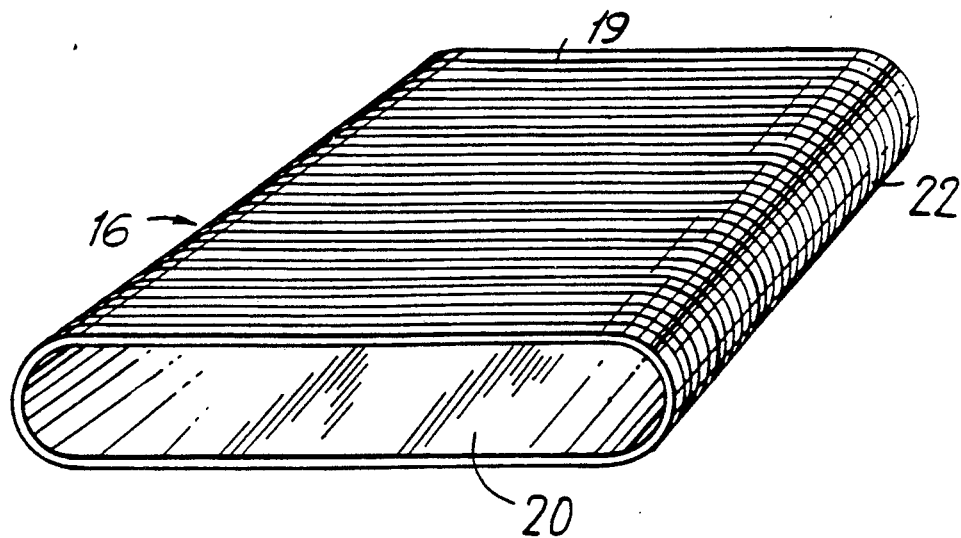
FIG. 3 is a plan view of the belt of the present invention.

A plan view of the belt 16 of the present invention is provided in FIG. 3. It has been an outer surface 19 and an inner surface 20. The outer surface 19 is characterized by a plurality of grooves 22, while the inner surface 20 is uniformly smooth. Grooves 22 spiral in a substantially longitudinal direction around the length of the belt by virtue of the helical fashion in which the outer surface 19 of the belt 16 is finished.

Figure 4:
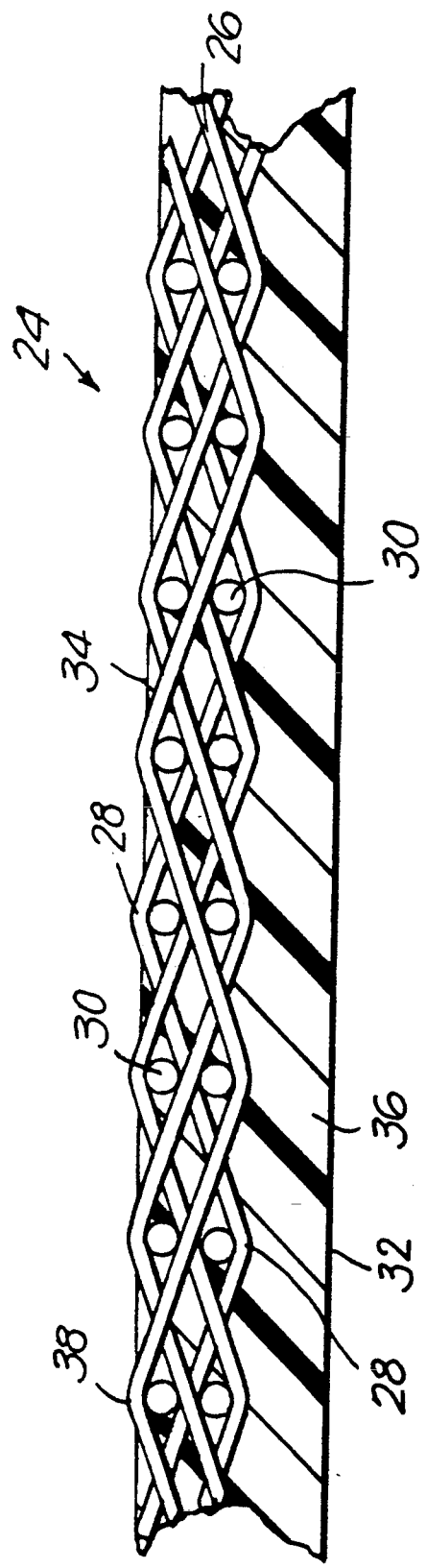
FIG. 4 is a cross section of a standard LNP belt.

FIG. 4 is a cross-section of a standard LNP belt which may be used to produce a grooved, void-volume belt in accordance with the present invention. The standard LNP belt 24 includes a woven base fabric 26 having machine-direction yarns 28 and cross-machine direction yarns 30. The machinedirection yarns 28 and cross-machine-direction yarns 30 may be monofilaments of a synthetic polymeric resin, such as polyester or polyamide. In addition, some of the cross-machine-direction yarns 30 may be spun yarns of a synthetic or natural fiber. Spun yarns may be used in the base fabric 26 in this manner where it is desired to prevent a coating to be applied to the base fabric 26 from completely penetrating through its woven structure. The base fabric 26, finally, takes the form of an endless loop as a consequence of either having been woven in endless form or flat woven and joined into endless form with a seam.

The standard LNP belt 24 has a shoe side 32, which is the inside of the endless loop, and a felt side 34, which is the outside of the endless loop. The inside of the endless loop is coated and impregnated with a thermoplastic or thermosetting resin, such as polyurethane, so that the resinous material penetrates completely through the base fabric 26, completely filling the interstices between the machinedirection yarn 28 and cross-machine-direction yarns 30 without leaving any voids within the coated and impregnated structure. In this way, the standard LNP belt 24 in its finished form is rendered impermeable to the passage of water or lubricating fluid.

The coating 36 of resinous material on the shoe side 32 of the standard LNP belt 24 completely covers the base fabric 26, and prevents any of the yarns thereof from coming into direct contact with arcuate pressure shoe 14. On the other hand, the knuckles 38 formed where the machine-direction yarns 28 weave around the cross-machine-direction yarns 30 of the base fabric may be visible on the felt side 34 of the standard LNP belt 24.

The standard LNP belt 24 is of uniform thickness or caliper, and its surface on the shoe side 32 is ground and polished to be as smooth as possible so that it may readily slide over the lubricated arcuate pressure shoe 14.

Figure 5:
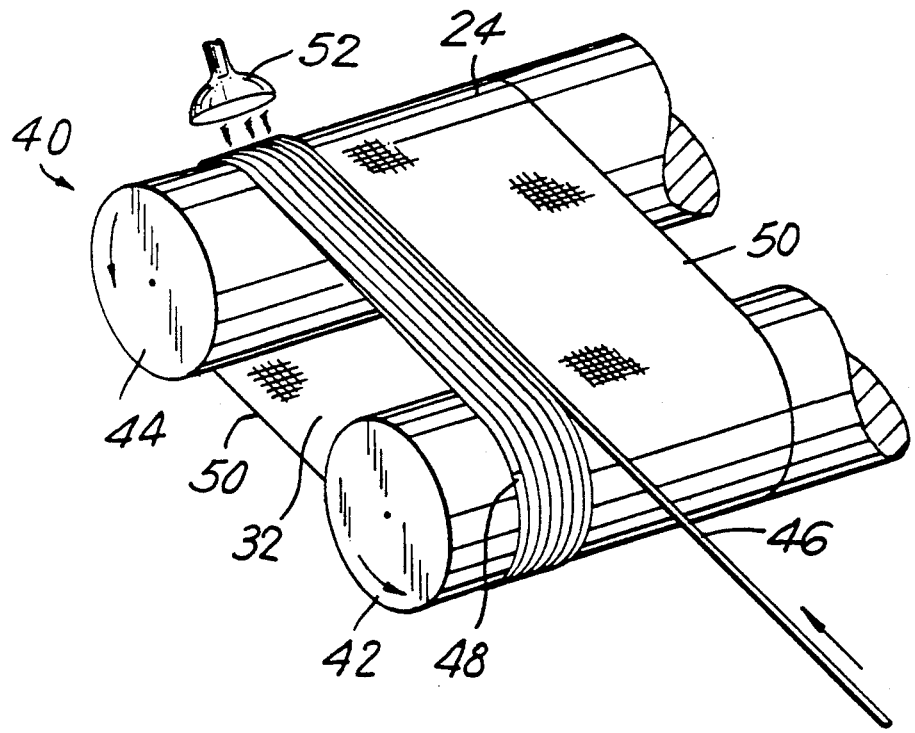
FIG. 5 illustrates the method by which the belt of the present invention may be manufactured.

The method by which a grooved, void-volume belt may be manufactured from a standard LNP belt 24 is illustrated in FIG. 5. The apparatus 40 includes a first process roll 42 and a second process roll 44, each of which is rotatable about its longitudinal axis. The first process roll 42 and the second process roll 44 are parallel to one another, and may be moved and set at any number of fixed distances from one another.

The manufacturing process is begun by mounting a standard LNP belt 24 around the first process roll 42 and a second process roll 44. Clearly, the shoe side 32 of the standard LNP belt comes into actual contact with the surfaces of the first process roll 42 and the second process roll 44, which are moved apart from one another and set at fixed positions such that the standard LNP belt 24 may be placed under tension.

A grooved, void-volume belt is manufactured from the standard LNP belt 24 by applying a strip 46 of polymeric material to its felt side 34. The details of the strip 46 will be provided below during the discussion regarding FIGS. 6 and 7. The process is begun by attaching the beginning 48 of strip 46 to the felt side 34 of the standard LNP belt 24 at a point adjacent to one of the two lateral edges 50 thereof.

Then, the first process roll 42 and the second process roll 44 are rotated in a common direction to wind the strip 46 around the felt side 34 of the standard LNP belt 24 in a closed helix, each coil or turn of this closed helix abutting against the turns adjacent thereto on either side, so as to completely cove the felt side 34 of the standard LNP belt 24. When this has been duly accomplished, the strip 46 is cut at some point adjacent to the other of the two lateral edges 5 of the standard LNP belt 24.

The strip 46 is continually attached to the felt side 34 of the standard LNP belt 24 by means of an adhesive, which may either be pre-applied to the strip 46 or continually applied, while the winding of the strip 46 onto the belt 24 is being carried out, at the point where the strip 46 first comes into contact with the felt side 34 of standard LNP belt 24. A urethane-based adhesive may be used for this purpose. A thin coating of fast-curing urethane may also used. Such a thin coating would fill any spaces between the knuckles on the uncoated side of the standard LNP belt, and would provide an adhesive surface. The thin coating would cure with time, heat, or a combination of time and heat. Alternatively, the strip 46 may be attached to the belt 24 through the application of heat, such as from infrared heat source 52.

Figure 6:
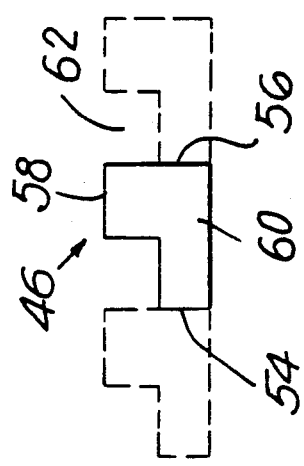
FIG. 6 is a cross section of a strip used in the manufacture of the present invention.
Figure 7:
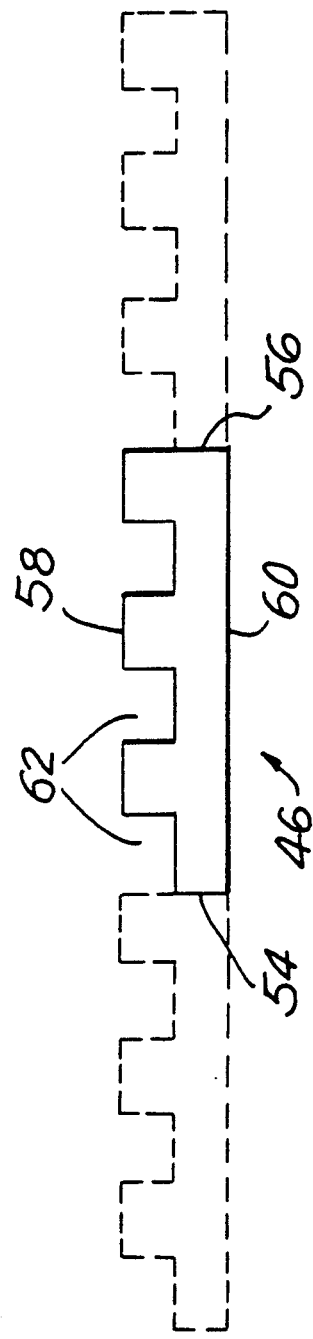
FIG. 7 is a cross section of a strip of a different configuration from that shown in FIG. 6.

Turning now to a consideration of the strip 46 itself, two configurations thereof are shown in FIGS. 6 and 7, respectively.

In general, the strip 46 may be produced by extruding an appropriate polymeric material, such as polyurethane, through a die of appropriate shape. The strip 46 has a first edge 54, a second edge 56, a constant or fixed width, a uniform thickness, a first side 58, and a second side 60. The first side 58 is provided with at least one groove 62. In FIG. 7, the strip 46 is of greater width than that shown in FIG. 6, and is provided with more than one groove 62. While being wound onto the felt side 34 of the standard LNP belt 24 in a closed helix, the second edge 56 of the strip 46 is wound so as to abut against the first edge 54 of the strip 46 already attached to the felt side 34 of the standard LNP, so that the helix formed by the strip 46 may be as tightly closed as possible.

As may now be recognized, in consequence of the manner in which the present grooved, void-volume belts 16 are constructed, the present invention renders it no longer necessary to coat both sides of an endless base fabric with a polymeric resin material, or to cut spiral or annular grooves in the coating on one side thereof by mechanical means, as the strip used to cover the felt side of standard LNP belt to produce the belt of the present invention already is provided with the required grooves.

In the belts 16 of the present invention, there would preferably be six to eight grooves 22 per inch as determined by counting across the belt 16 in a direction transverse to the grooves 22. The depth of the grooves 22 would fall in the approximate range of from 0.060 inch to 0.100 inch; the width of the grooves 22 would fall in the approximate range of from 0.020 inch to 0.040 inch.

It will readily be understood that modifications to the above would be obvious to anyone skilled in the art without departing from the scope of the appended claims.

What is claimed is:

1. A method for manufacturing a grooved, void-volume belt for use as a long nip press belt on a long nip press in a papermachine comprising the steps of:

providing a first process roll and a second process roll, said first process roll and said second process roll being rotatable about their respective axes;

mounting a long nip press belt on said first process roll and said second process roll, said long nip press belt including a woven base fabric in the form of an endless loop, said endless loop having an inside surface, an outside surface, and a pair of lateral edges, said lateral edges being separated from one another by a distance equal to the width of said belt, said inside surface of said endless loop of said base fabric being coated with a polymeric resin, said polymeric resin fully impregnating said woven base fabric, said long nip press belt having a smooth inner surface and a uniform thickness;

moving said first process roll and said second process roll apart from one another to fixed positions such that said long nip press belt may be placed under tension, and wherein said axes of said first, process roll and said second process roll are parallel to one another;

fixing said first process roll and said second process roll at said positions;

providing a strip of polymeric material for covering said outside surface of said long nip press belt in a closed helix, said strip of polymeric material having a beginning, a first edge and a second edge, a constant width, a uniform thickness, and a first side being provided with at least one groove having a longitudinal direction along said strip;

attaching said second side of said strip at the beginning of said elongated strip to said outer surface of said long nip press belt at a point on one of said pair of lateral edges of said long nip press belt;

rotating said first process roll and said second process roll in a common direction to wind said strip onto said outer surface of said long nip press belt in a closed helix, wherein said second edge of said strip being applied to said outer surface abuts against said first edge of said strip previously attached to said outer surface of said long nip press belt, so as to completely cover said outer surface of said long nip press belt, said second side of said strip being continually attached to said outer surface of said long nip press belt until said outer surface of said long nip press belt is completely covered by said strip in a closed helix;

cutting said strip at a point on the other of said pair of lateral edges of said long nip press belt; and removing said grooved, belt from said first process roll and said second process roll.

2. The method as claimed in claim 1 wherein said second side of said strip is attached to said outer surface of said long nip press belt with an adhesive.

3. The method as claimed in claim 1 wherein said second side of said strip is coated with an adhesive prior to being wound onto said long nip press belt, and is attached therewith to said long nip press belt.

4. The method as claimed in claim 1 wherein said second side of said strip is continually attached to said outer surface of said long nip press belt by continually applying an adhesive at the point where the strip and belt come into contact while said strip is being wound onto said belt.

5. The method as claimed in claim 1 wherein said second side of said strip is attached to said outer surface of said long nip press belt by heating.

* * * * *